Figures 1, 2, 3, 4:
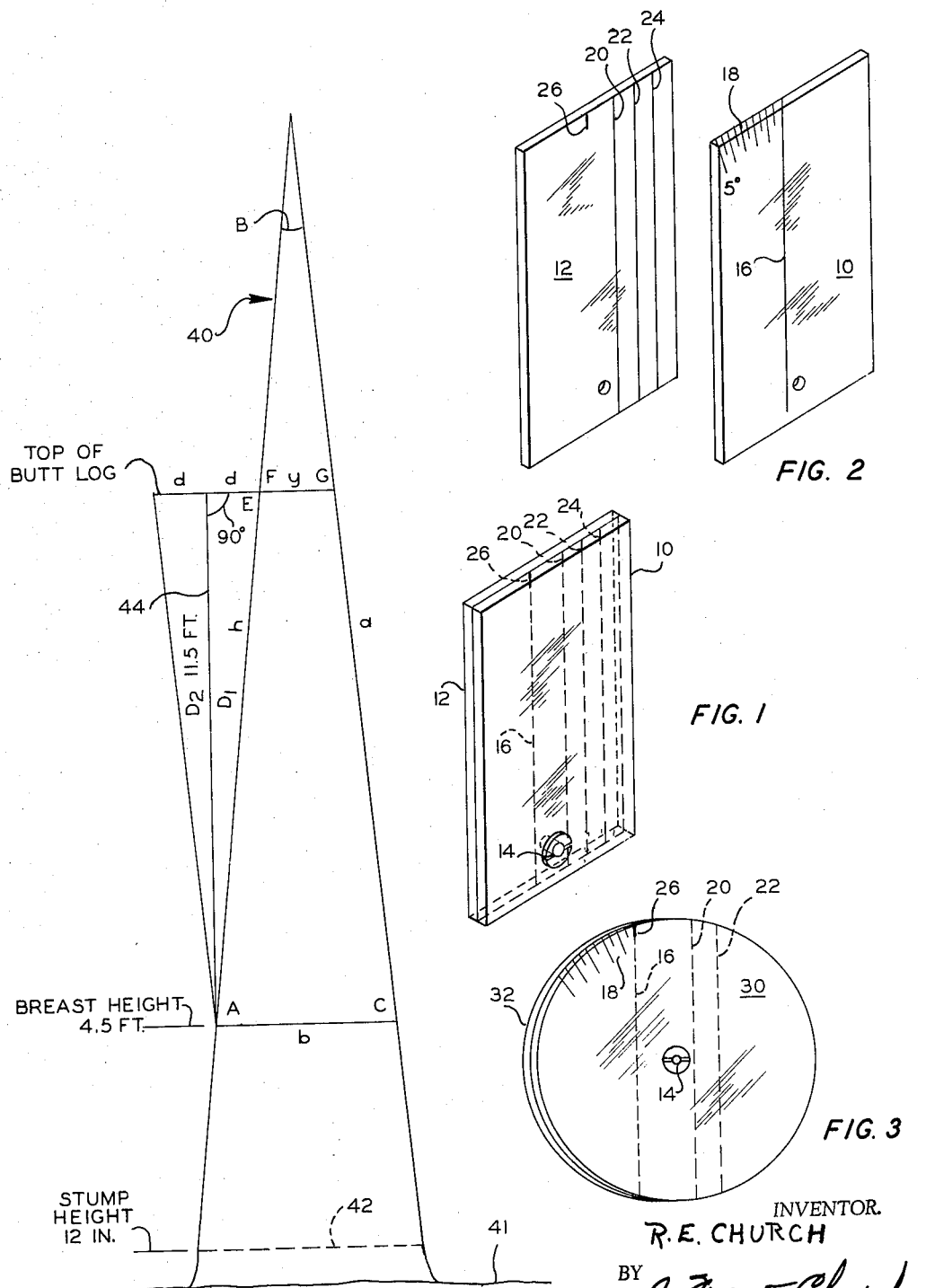

Nov. 16, 1965  R. E. CHURCH  3,217,414
MEASUREMENT OF TAPER AND FORM CLASS OF TREES
Filed July 20, 1962

INVENTOR.
R. E. CHURCH
BY J. Frank Church 3,217,414
MEASUREMENT OF TAPER AND FORM CLASS OF TREES
Robert E. Church, 829 Alvaredo St., Jackson, Miss.
Filed July 20, 1962, Ser. No. 211,218
8 Claims. (Cl. 33—64)

This invention relates to a meter and method for measuring the taper and form class of standing trees.

In the field of forestry, form class is the diameter inside bark at the top of the first 16-foot log divided by the diameter outside bark at breast height (4½ feet above ground). Volume table books most widely used give separate tables for different form classes. In practice, foresters estimate an average and use the appropriate table for each species when figuring volumes of timber marked or inventoried. By ascertaining the form class of a tree, the volume of timber therein is readable from a table.

This invention is concerned with a meter or device for measuring the taper for determining the form class of trees.

Accordingly, it is an object of the invention to provide a simple meter or device for use in quickly determining the form class of trees. Another object is to provide a method and means for determining the taper or vertex angle of a tree for use in determining the form class of the tree. Other objects of the invention will become apparent to one skilled in the art upon consideration of the accompanying disclosure.

A broad aspect of the method of the invention comprises sighting a first line parallel with one side of a tree, sighting a second line parallel with the other side of the tree, and measuring the angle of convergence of the lines as the taper of the tree. The lines are fixed on transparent rotatable plates pivotally attached to each other with degree marks and an index mark provided to facilitate reading the taper.

A broad aspect of the apparatus of the invention comprises a pair of relatively thin transparent plates pivotally attached for rotation, one over the other, there being at least one straight line on each plate which can be brought into either parallel or angular arrangement by rotation of said plates, an index mark adjacent an end of one of said plates opposite the line on the other plate when said lines are parallel, and angular degree marks on said other plate calibrated away from said parallel lines so that rotation of said plates to bring said lines parallel with the opposite sides of a tree, when sighting therethru at said tree, gives a reading in degrees indicating the angle of convergence of said sides. The angle of convergence of said tree sides or the taper is readily convertible into form class and a table of conversion of taper angle to form class can be readily set up.

A more complete understanding of the invention may be obtained by reference to the accompanying schematic drawing of which FIGURE 1 is a pictorial view of one embodiment of the meter of the invention; FIGURE 2 is an exploded view of the meter of FIGURE 1; FIGURE 3 is a pictorial view of a second embodiment of the meter; and FIGURE 4 is a tree form in elevation illustrating the significance and relationship of taper angle and form class.

Referring to FIGURES 1 and 2, a pair of transparent plates or sheets 10 and 12 in rectangular form are pivotally attached by attaching means 14 which may be male and female threaded elements provided with flat heads and with slots therein for adjusting. Plate 10 is provided with a longitudinal line 16 on its face adjacent sheet 12 and also degree marks 18 on the same face extending toward the left edge of the sheet, the line 16 representing 0°.

Plate or sheet 12 is provided with longitudinal parallel lines 20, 22 and 24, and with an index mark 26 which is precisely opposite line 16 when line 16 is parallel with lines 20, 22, and 24. These markings on sheet 12 are preferably on the face adjacent sheet 10.

FIGURE 2 shows an exploded view of the device of FIGURE 1, for clarity.

In using the meter shown, the device is held between the eye and the tree to be measured so that line 16 is parallel with one side of the tree and any one of lines 20, 22, and 24 is parallel with the opposite side of the tree. This condition is arrived at by rotating one plate with respect to the other. Since the sides of the tree converge upwardly, the top end of line 16 is now located to the right of index mark 26 and the degrees and minutes of rotation can be read on scale 18 by finding the particular scale mark opposite index mark 26. This degree and minutes value is the measure of the taper angle of the tree as will be shown in discussion of FIGURE 4.

FIGURE 3 illustrates an embodiment of the device utilizing circular plates, demonstrating that other shapes than rectangular are within the scope of the invention. Plate 30 is rotatable over plate 32 around pivot 14, as in the previous figures.

In FIGURE 4, numeral 40 designates a tree having an apex angle B and base angles A and C. Base $b$ is at breast height or 4.5 ft. The top of the butt log $y$ is 16 ft. above stump height of 12 inches (above ground level 41) represented by line 42. Angle $D_1$ is the complement of angle A or the divergence of side $h$ from perpendicular line 44. Angle $D_2$ is made equal to $D_1$. $D_1+D_2$ or $2D_1$ is equal to taper angle B. $D_1+E$ is equal to 90°. A, C, F, G and E are equal. Form class is equal to $y/b$ and 100 form class is equal to $2d/b$.

Now, assuming a form class of 80 or .80 is equal to $y/b$, and a DBH of 1.5 ft.

$$2d/1.5 = .20 \quad 2d = .20(1.5) = .30 \text{ ft.}$$

Then, $$\tan 2D = \frac{2d}{11.5} = \frac{0.3}{11.5} = 0.0260869$$

$$2D = 1°29' + = B$$

The taper angle is 1°29'.

In the same manner, angle B for various form classes by tree diameters can be calculated. Thus, the following table of taper angles, DBH, and form classes is readily obtained:

*Table*
TAPER ANGLES

| DBH | FC=70 | FC=75 | FC=80 | FC=85 | FC=90 | FC=95 |
|---|---|---|---|---|---|---|
| 6 | 0°45' | 0°37' | 0°30' | 0°22' | 0°15' | 0° 7' |
| 12 | 1°30' | 1°15' | 1°00' | 0°45' | 0°30' | 0°15' |
| 18 | 2°14' | 1°52' | 1°29' | 1°07' | 0°45' | 0°22' |
| 24 | 2°59' | 2°59' | 2°00' | 1°30' | 1°00' | 0°30' |
| 30 | 3°44' | 3°07' | 2°30' | 1°52' | 1°15' | 0°37' |
| 36 | 4°28' | 3°44' | 2°59' | 2°14' | 1°30' | 0°45' |
| 42 | 5°13' | 4°19' | 3°29' | 2°37' | 1°45' | 0°52' |

The device herein described is effective in quickly determining the apex angle of a tree and the form class is readable from a table such as that above. The volume of timber is then obtained from regular form class tables available and commonly used by foresters.

Since the meter measures from outside of bark, it is necessary to have available bark thickness measurements at 17 feet above ground level on enough trees of various sizes and species to obtain conversion figures or correction factors to inside bark form class, which volume tables use. These conversion figures or correction factors for any given species of tree in a given locality can be made available for use in determining form class and volume of timber for said species.

The meter disclosed herein has been made in the form shown in FIGURES 1 and 2 and has been used to determine apex angle and volume of timber. It is simple, and easy to use.

Certain modifications of the invention will become apparent to those skilled in the art and the illustrative details disclosed herein are not to be construed as unnecessarily limiting the invention.

I claim:
1. A meter for measuring the taper of a standing tree which comprises in combination:
   (1) first and second relatively thin transparent plates of similar size and shape pivotally attached by a common pivot extending thru the plates so as to be superimposed and rotatable one over the other;
   (2) a first straight line extending across said first plate on one side of said pivot for sight aligning with one side of said tree from a short distance;
   (3) a second straight line extending across said second plate on the opposite side of said pivot and positionable in spaced-apart parallel relation to said first line by rotation of said plates for sight aligning with the other side of said tree from said distance to effect simultaneous alignment of said lines with said sides of said tree;
   (4) an index mark on said second plate positioned in exact alignment with and directly beneath said first line when said first and second lines are in parallel relation; and
   (5) an angular degree scale of several degrees on said first plate beginning with 0° at said first line and extending away from said second line when said lines are parallel so that simultaneous alignment of said lines with opposite sides of said tree provides a reading in degrees of the convergence of said lines and the taper of said tree.

2. A meter for measuring the taper or form class of a standing tree which comprises in combination:
   (1) a first relatively thin transparent plate provided with an index mark on a broad face thereof adjacent one edge and a first straight line on said face extending to said edge spaced from said index mark, said first line being sight alignable thru said plate with one side of a standing tree;
   (2) a second relatively thin transparent plate fastened by common pivot means to rotate with a broad face thereof adjacent said broad face of said first plate;
   (3) a second straight line on the broad face of said second plate positionable parallel to and spaced laterally from said first line by rotation of said plates, said second line coinciding with said index mark when said lines are parallel and being sight alignable with the opposite side of said tree to effect simultaneous sight alignment of said lines with the sides of said tree by sighting directly thru said plates substantially perpendicular to said broad faces; and
   (4) a scale of angular degrees of rotation on said second plate using said second line as 0° and extending away from said first line, to provide for reading the taper of said tree in the convergence of said lines as measured on said scale.

3. The meter of claim 1 wherein said plates are rectangular and coextensive, said lines extend longitudinally of said plates, from end-to-end thereof, said fastening means is intermediate said first and second lines and adjacent the end of the plates remote from said index mark, and said degree marks are adajcent the end of said opposite plate.

4. The meter of claim 1 wherein said plates are circular and coextensive and said fastening means is at the center thereof.

5. The meter of claim 2 wherein said plates are rectangular and coextensive and said pivot is positioned adjacent the longitudinal center lines of said plates and adjacent one end thereof intermediate said lines.

6. A method of determining taper of a standing tree which comprises providing first and second transparent plates pivotally slidable one over the other, there being a straight line on each plate spaced apart and rotatable into parallel and converging arrangement by rotation of said plates, an index mark on said first plate directly opposite the line on said second plate when said lines are parallel, and angular degree marks on said second plate starting with the line on said second plate and extending away from the line on said first plate; holding said plates between the eye and a tree to be metered and sighting therethru to adjust the line on one plate parallel with one side of the tree; rotating the other plate so that the line thereon is parallel with the other end of the tree; and reading the degree mark coinciding with said index mark as the angle of convergence and taper of said tree.

7. A meter for measuring the taper of a standing tree which comprises in combination:
   (1) a first transparent plate having a first straight reference line extending across same;
   (2) a second transparent plate having a second straight reference line extending across same;
   (3) a common pivot fastening said plates in rotatable arrangement, one over the other so that lines on one plate rotate over lines on the other;
   (4) an index mark on said second plate adjacent the edge thereof and spaced perpendicularly a relatively short distance from said second line, said index mark being in exact alignment with said first line when said first and second lines are parallel; and
   (5) an angular degree scale on said first plate beginning with 0° at said first line and extending away from said second line when said lines are parallel so that simultaneous sight alignment of said lines with opposite sides of a tree provides a reading in angular degrees of convergence of the lines and the taper of said tree.

8. A method of determining taper of a standing tree which comprises providing first and second transparent plates pivotally slidable one over the other, there being a straight line on each plate spaced apart and rotatable into parallel and converging arrangement by rotation of said plates, an index mark on said first plate directly opposite the line on said second plate when said lines are parallel, and angular degree marks on said second plate starting with the line on said second plate and extending away from the line on said first plate; holding said plates between the eye and a tree to be metered and sighting therethru and aligning the parallel lines on the plates with opposite sides of the tree by rotation of one plate with relation to the other; and reading the degree mark coinciding with said index mark as the taper of said tree.

References Cited by the Examiner

UNITED STATES PATENTS

| | | | |
|---|---|---|---|
| 1,133,540 | 3/1915 | Dannenberg | 33—76 |
| 2,440,827 | 5/1948 | Marean et al. | 33—61 |
| 2,527,189 | 10/1950 | Kittelson | 33—64 |
| 2,535,411 | 12/1950 | Hansen | 33—64 |
| 2,545,935 | 3/1951 | Warner | 33—1 X |
| 2,681,508 | 6/1954 | Palmer | 33—66 |

FOREIGN PATENTS 453,594  12/1927  Germany.

ISAAC LISANN, *Primary Examiner.*

ROBERT B. HULL, *Examiner.*